US008866671B2

(12) United States Patent
Morrison

(10) Patent No.: US 8,866,671 B2
(45) Date of Patent: Oct. 21, 2014

(54) METHODS AND APPARATUSES USING MIXED NAVIGATION SYSTEM CONSTELLATION SOURCES FOR TIME SETTING

(75) Inventor: William James Morrison, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 12/612,598

(22) Filed: Nov. 4, 2009

(65) Prior Publication Data

US 2011/0102260 A1       May 5, 2011

(51) Int. Cl.
*G01S 19/33*    (2010.01)
*G01S 19/25*    (2010.01)

(52) U.S. Cl.
CPC .............. *G01S 19/256* (2013.01); *G01S 19/33* (2013.01)
USPC .................................................. 342/357.73

(58) Field of Classification Search
CPC .............................. G01S 19/256; G01S 19/33
USPC .................................................. 342/357.73
See application file for complete search history.

(56) References Cited

U.S. PATENT DOCUMENTS

| | | | | |
|---|---|---|---|---|
| 6,055,491 | A * | 4/2000 | Biliris et al. | 702/176 |
| 7,936,303 | B2 * | 5/2011 | Huang et al. | 342/357.62 |
| 8,054,222 | B2 * | 11/2011 | van Diggelen et al. | 342/357.67 |
| 2006/0179452 | A1 | 8/2006 | Amodeo et al. | |
| 2008/0019578 | A1 | 1/2008 | Saito et al. | |
| 2009/0219203 | A1 | 9/2009 | Van Diggelen et al. | |
| 2011/0025559 | A1 * | 2/2011 | Chansarkar et al. | 342/357.73 |
| 2011/0080322 | A1 * | 4/2011 | Abraham | 342/357.73 |

FOREIGN PATENT DOCUMENTS

| | | | |
|---|---|---|---|
| EP | 2015151 A2 * | 1/2009 | |
| TW | 200919210 A | 5/2009 | |
| TW | I311733 B | 7/2009 | |
| WO | WO 2007/106908 A1 * | 9/2007 | |

OTHER PUBLICATIONS

International Search Report and Written Opinion—PCT/US2010/055307—ISA/EPO—Jun. 14, 2011.
Syrjarinne J: "Possibilities for GPS Time Recovery with GSM Network Assistance", Proceedings of the Institute of Navigation (ION) GPS, XX, XX, Sep. 19, 2000, pp. 955-965, XP002315980.
Xu Bo et al: "Satellite selection algorithm for combined GPS-Galileo navigation receiver", Autonomous Robots and Agents, 2009. ICARA 2009. 4th International Conference on, IEEE, Piscataway, NJ, USA, Feb. 10, 2009, pp. 149-154, XP031443715, ISBN: 978-1-4244-2712-3.
Taiwan Search Report—TW099137823—TIPO—Mar. 20, 2013.

* cited by examiner

*Primary Examiner* — Frank J McGue
(74) *Attorney, Agent, or Firm* — Howard Seo

(57) ABSTRACT

Methods and apparatuses are provided that may be implemented in various electronic devices to possibly reduce a first-time-to-fix and/or otherwise increase the performance or efficiency of a device by using portions of system time identifiers from different systems to determine at least one navigation system time.

38 Claims, 4 Drawing Sheets

METHODS AND APPARATUSES USING MIXED NAVIGATION SYSTEM CONSTELLATION SOURCES FOR TIME SETTING

BACKGROUND

1. Field

The subject matter disclosed herein relates to electronic devices, and more particularly to methods and apparatuses for use in and/or with a device capable of receiving satellite positioning systems (SPS) signals.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information.

Another popular and increasingly important wireless technology includes navigation systems and in particular satellite positioning systems (SPS) such as, for example, the global positioning system (GPS) and other like Global Navigation Satellite Systems (GNSS). SPS enabled devices, for example, may receive wireless SPS signals that are transmitted by orbiting satellites of a GNSS and/or other terrestrial based transmitting devices. The received SPS signals may, for example, be processed to determine a corresponding GNSS system time, a range or pseudorange, an approximate or accurate geographical location, altitude, and/or speed of the SPS enabled device. Consequently, various position and/or velocity estimation processes may be supported, at least in part, using an SPS enabled device.

Certain devices may be enabled to receive and process SPS signals transmitted by two or more GNSS. For example, certain devices may include one or more SPS receivers capable of receiving SPS signals from GPS and one or more other GNSS, such as, e.g., Galileo or GLONASS. Each GNSS has a specific corresponding 'system time', which is communicated through the SPS signals to receiving devices. For example, GPS and GLONASS transmit respective system time information through navigation messages that are periodically transmitted via the SPS signals. An SPS receiver may then decode one or more navigation messages, as needed, to access the system time information and determine the system time for the applicable GNSS. In certain situations, a significant period of time may be required, e.g., on start-up, to determine a system time for one or more GNSS or other like navigation systems. This tends to increase the time-to-fix an estimated position as well. Hence, it may be useful to provide methods and apparatuses that may reduce the period of time spent determining system time(s) for one or more navigation systems in an SPS.

SUMMARY

In accordance with certain aspects, techniques are provided which may be implemented through various methods and apparatuses in a device having a satellite positioning system (SPS) receiver to improve performance of a navigation service and/or other like process in certain situations. Here, for example, certain techniques may be implemented that may reduce a first-time-to-fix and/or otherwise increase the performance or efficiency of a device in determining its current estimated position based, at least in part, on received SPS signals.

In certain example implementations, a method may be implemented in an SPS receiver enabled device, which includes obtaining partial first system time information and second system time information. Here, for example, the partial first system time information may comprise one or more portions but not all of a first system time identifier associated with a first navigation system. Here, for example, the second system time information may comprise at least a portion of a second system time identifier associated with a second system. The method may include operatively identifying a first system time associated with the first navigation system based, at least in part, on the partial first system time information and at least the portion of the second system time information.

In certain example implementations, the first navigation system and the second system may comprise different Global Navigation Satellite Systems. In certain other example implementations, at least one of the first navigation system or the second system may not comprise a Global Navigation Satellite System.

In certain example implementations, the first system time identifier may comprise a plurality of data portions that together identify the first system time. Here, for example, at least two of the plurality of data portions may be periodically transmitted by the first navigation system at different intervals. The partial first system time information may, for example, comprise a subset of the plurality of data portions.

In certain example implementations, wherein at least one of the plurality of data portions has not been obtained, operatively identifying the first system time may further comprise operatively substituting at least the portion of the second system time information for the at least one of the plurality of data portions that has not been obtained. Here, for example, operatively substituting at least the portion of the second system time information for the at least one of the plurality of data portions that has not been obtained may comprise converting at least the portion of the second system time information for use with the partial first system time information, and/or converting at least a portion of the partial first system time information for use with at least the portion of the second system time information.

In certain example implementations, the operatively identified first system time may specify a first system time offset operatively associated with a locally maintained time.

In certain example implementations, the method may further include obtaining third system time information, wherein the third system time information comprises at least a portion of a third system time identifier associated with a third system. The method may then include operatively identifying the first system time further by operatively identifying the first system time based also, at least in part, on at least the portion of the third system time information.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
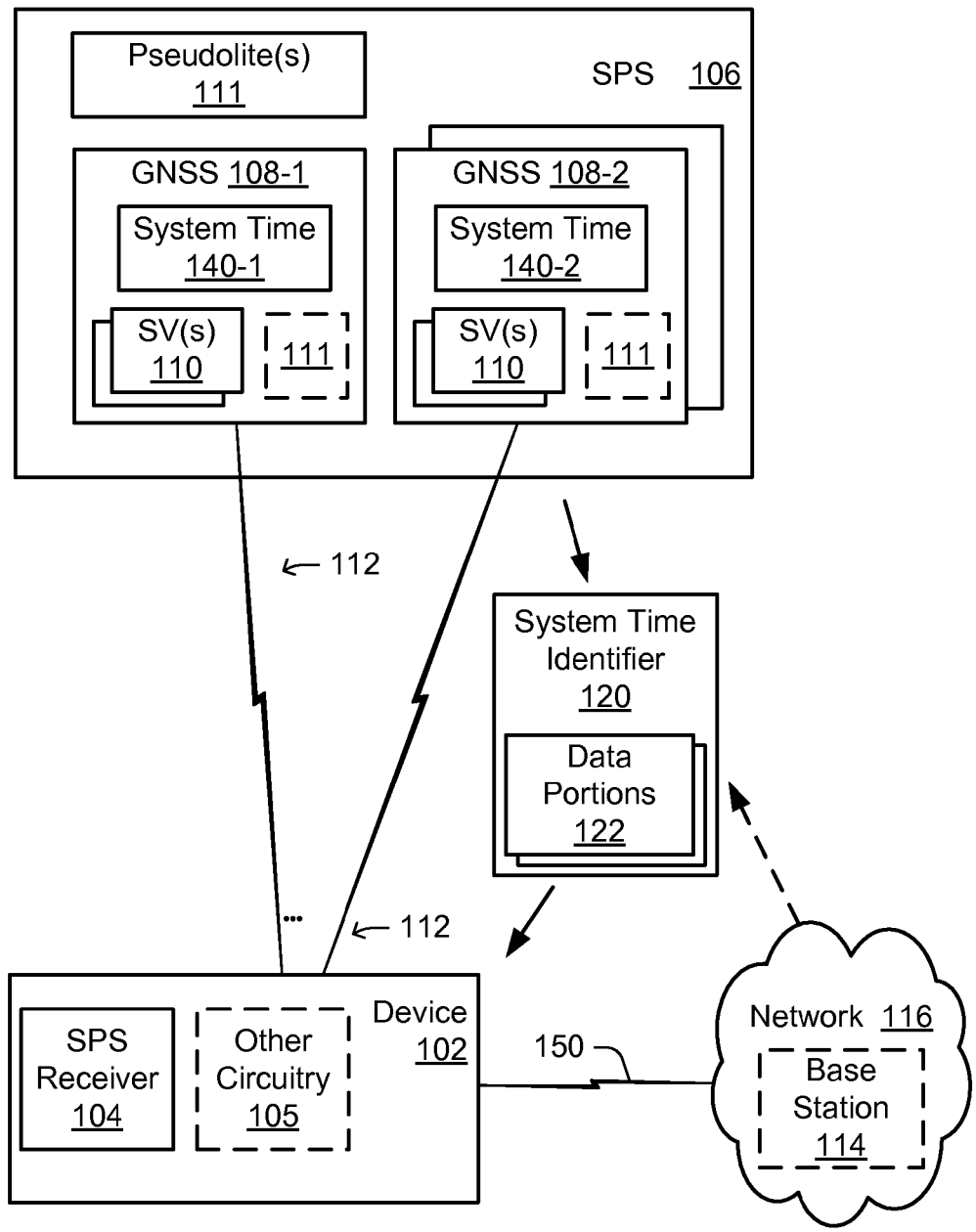
FIG. 1 is a schematic block diagram illustrating an exemplary signaling environment that includes at least one device capable of supporting, at least in part, one or more position/velocity estimation processes based, at least in part, on one or more transmitted and received SPS signals comprising system time identifiers, in accordance with an implementation.

In accordance with certain example implementations, a device having a satellite positioning system (SPS) receiver may benefit by implementing a method to improve performance of a navigation service and/or other like process in certain situations. Here, for example, certain techniques may be implemented that may reduce a first-time-to-fix and/or otherwise increase the performance or efficiency of a device in determining its current estimated position based, at least in part, on received SPS signals. Such techniques may, for example, reduce the period of time spent determining system time(s) by enabling a device to determine or otherwise identify in some manner a current system time associated with a navigation system based, at least in part, on system time information associated with one or more other navigation systems and/or one or more other systems for which other respective system time information is available. For example, a device may operatively mix or otherwise use available portions of system time identifiers from different systems to determine at least one system time associated with at least one navigation system.

By way of example but not limitation, an SPS receiver and/or like enabled device may obtain partial first system time information associated with a navigation system. Such partial first system time information may include, for example, some but not all of the portions of a first system time identifier which identifies a system time for a navigation system. Such device may also obtain other system time information such as, for example, at least a portion of at a second system time identifier associated with a second system. Such device may operatively identify the first system time associated with the first navigation system based, at least in part, on at least a portion of the partial first system time information and at least a portion of the second system time information. Thus, rather than waiting to receive all of the data portions of a system time identifier which may be transmitted over time, a device may be able to use certain available system time information associated with one or more other systems to determine a substitute for certain unavailable data portions.

In certain example implementations, a first navigation system and a second system may include different GNSS. In certain other example implementations, a first navigation system and/or a second system may not include a GNSS.

In certain example implementations, a first system time identifier may include a plurality of data portions that together identify a first system time. Here, for example, at least two of the plurality of data portions may be periodically transmitted by a first navigation system at different intervals. Thus, for example, partial first system time information may include a subset of the plurality of data portions as received over time.

In accordance with certain aspects of the present description, in certain instances even though some of the data portions may be unavailable (e.g., not yet received, decoded, etc.) a device may still be able to identify a first system time by operatively substituting at least a portion of available second system time information for the unavailable data portions. Thus, in certain example implementations, a device may convert at least a portion of available second system time information for use with available partial first system time information, and/or convert at least a portion of the available partial first system time information for use with at least a portion of the second system time information.

In certain example implementations, as a result a device may operatively identify a first system time by specifying a first system time offset operatively associated with a locally maintained time, and/or some other known or determinable time.

In certain example implementations, a device may operatively identify a first system time based, at least in part, on still other available (full or partial) system time information associated with one or more other systems.

By way of example but not limitation, some example methods and apparatuses described herein may be implemented as part of, and/or to operatively support, various positioning processes (e.g., navigation services) associated with one or more GNSS or other like navigation systems. Such positioning processes may, for example, be performed by a device operating in a 'standalone' mode. In other example, such positioning processes may be performed by a device operating in an 'assisted' mode with one or more other devices. In certain example implementations, a device may take the form of a mobile station (MS).

Also as described in greater detail in subsequent sections, as used herein an SPS may include a variety of like or different types of systems, devices, processes, etc., that are capable of providing and/or otherwise supporting in some manner a position/velocity estimation process. By way of example but not limitation, in certain example implementations an SPS may include one or more GNSS, such as, the global positioning system (GPS), GLONASS, Galileo, etc., having a plurality of SVs, and/or one or more terrestrial based networks/ devices such as pseudolite, which transmit SPS signals that may be acquired by an SPS enabled device.

As used herein, a position/velocity estimation process may include any process in which a device may be involved, that in some manner is based, at least in part, on SPS related information associated with at least one SPS signal acquired by an SPS receiver in the device and/or a SPS receiver coupled to but external to the device. In certain example implementations, a position/velocity estimation process may include a position/navigation capability that is provided by a device based on locally maintained measurement information. In certain other example implementations, a position/velocity estimation process may include a position/navigation capability that is provided in part by one or more other devices with assistance from a host device based, at least in part, on SPS related information that is communicated between the host device and the one or more other devices.

Reference is now made to FIG. 1, which is a schematic block diagram illustrating an exemplary signaling environment 100 that includes at least one device 102 capable of supporting, at least in part, one or more position/velocity estimation processes based, at least in part, on one or more transmitted and received SPS signals comprising system time identifiers 120, in accordance with an example implementation.

Environment 100 may include various computing and communication resources capable of providing at least some form of a position/velocity estimation process with regard to device 102 based, at least in part, on one or more SPS signals 112 from an SPS 106. Device 102 is representative, therefore, of an electronic device that is capable of performing with or without assistance a position/velocity estimation process based at least in part on SPS signals. Accordingly, device 102 may include or otherwise be operatively coupled to at least one SPS receiver 104. Thus, for example, device 102 may take the form of a stand-alone navigation circuit or device in certain implementations.

In other implementations, as illustrated in the example shown in FIG. 1, device 102 may include other circuitry 105 and/or the like which enables device 102 to perform and/or support other processes. By way of example but not limitation, device 102 may take the form of a mobile or portable computing device or machine that may also be capable of communicating with one or more resources within a wireless/wired communication network 116 over one or more wireless communication links 150 coupled to a base station 114 or other like access point, and/or other system which may transmit system time identifiers. Device 102 may include a mobile station (MS) such as a cellular phone, a smart phone, a personal digital assistant, a portable computing device, a navigation unit, and/or the like or any combination thereof, for example. In other example implementations, device 102 may take the form of one or more integrated circuits, circuit boards, and/or the like that may be operatively enabled for use in another device.

Device 102 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

As illustrated in the example in FIG. 1, SPS 106 may, for example, include one or more GNSS 108 or other like navigation systems, shown here are GNSS 108-1 and GNSS 108-2, each of which may include a different plurality of SVs 110 that may transmit different SPS signals 112 comprising corresponding system time identifiers 120 having a plurality of data portions 122. As illustrated, SPS 106 may, for example, include one or more pseudolites 111 and/or other like transmitting devices that may transmit certain SPS signals 112.

Techniques described herein may be used with an "SPS" that includes any one of several navigation systems such as GNSS and/or combinations of GNSS, or other regional/local navigation systems. Furthermore, such techniques may be used with positioning systems that utilize pseudolites or a combination of space vehicles (SVs) and pseudolites. Pseudolites 111 may, for example, include ground-based transmitters that broadcast a PN code or other ranging code (e.g., similar to a GPS or CDMA cellular signal). Such a transmitter may be assigned a unique PN code so as to permit identification by a remote receiver. Pseudolites may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include pseudolites, equivalents of pseudolites, and possibly others. The terms "SPS signals", as used herein, is intended to include SPS signals from pseudolites or equivalents of pseudolites.

Some exemplary methods and apparatuses will now be described, which may be implemented in whole or part in one or more devices, such as device 102, that process SPS signals comprising system time identifiers. By way of example, one or more devices 102 may include dedicated and/or special-purpose programmed circuitry capable of identifying at least a first system time associated with a first navigation system within an SPS based, at least in part, on available partial first system time information and at least a portion of available system time information associated with one or more other systems.

Figure 2:
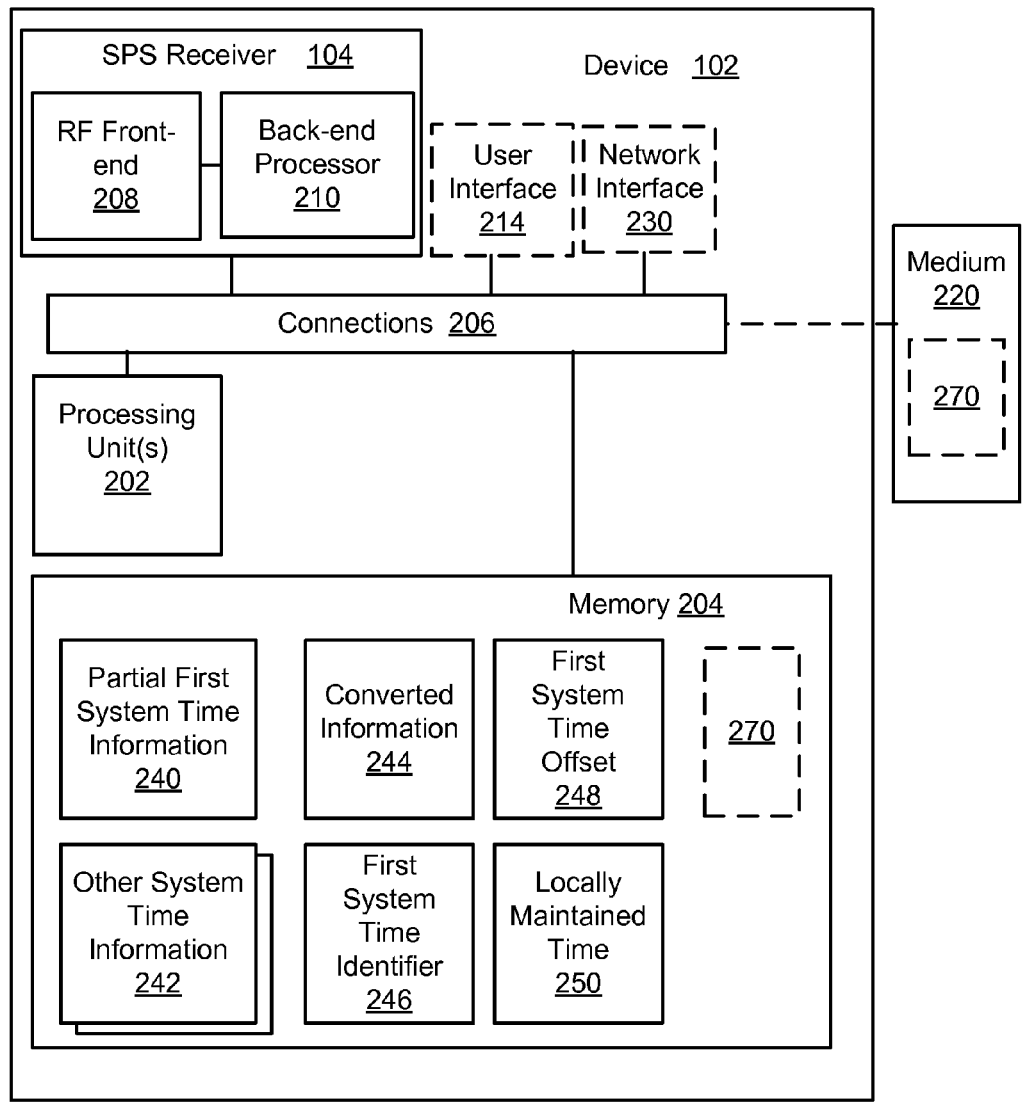
FIG. 2 is a schematic block diagram illustrating certain features of an exemplary device, for example as in FIG. 1, capable of employing a reduced time-to-fix position/velocity estimation process by using portions of system time identifiers from different systems to determine at least one system time, in accordance with an implementation.

As illustrated in the exemplary schematic block diagram of FIG. 2, in certain example implementations, device 102 may include an SPS receiver 104 capable of receiving an RF signal that includes at least one SPS signal 112. SPS receiver 104 may include, for example, an RF front-end circuit 208 coupled to a back-end processor (processing unit) 210. RF front-end circuit 208 may, for example, generate one or more electronic signals representing one or more GNSS or other like navigation system signals. In certain implementations, back-end processor 210 may use the one or more electronic signals from RF front-end circuit 208 to establish information, such as, for example, all or portions of the information stored in memory 204.

Various forms/types of information may be stored in memory 204. By way of example but not limitation, as illustrated in FIG. 2, memory 204 may store partial first system time information 240, other system time information 242, converted information 244, first system time identifier 246 information, first system time offset 248 information, locally maintained time 250 information, and/or any combination thereof or the like. Memory 204 may have stored therein various other data and computer implementable instructions 270. Such instructions may be executed, for example, by one or more processing units or processors 202/210

In certain example implementations, SPS receiver 104 and/or processing unit(s) 202/210 may be enabled to exchange one or more electronic signals representing at least a portion of the information, etc., stored in memory 204, for example, via one or more connections 206.

As mentioned, in certain example implementations, one or more of the circuits illustrated within device 102 may be operatively responsive to, or otherwise affected in some manner by, computer implementable instructions 270, which are stored in memory 204. Thus, for example, at least a portion of the computer implementable instructions 270 may be implemented by processing unit(s) 202/210, back-end processor 210, communication network interface 230, etc., to provide or otherwise operatively support in some manner the techniques described herein. It should be recognized that in certain implementations, one or more of processing unit(s) 202/210 and back-end processor 210 may comprise the same or some common circuitry.

As illustrated in FIG. 2 an article of manufacture represented here by a computer readable medium 220 may be provided and accessed by processing unit(s) 202/210, for example. As such, in certain example implementations, the methods and/or apparatuses may take the form in whole or part of a computer readable medium 220 that includes computer implementable instructions 270 stored thereon, which if executed by at least one processing unit or other like circuitry are enabled to enable the processing unit(s) 202/210 and/or the other like circuitry to perform all or portions of validator process 260 and/or supporting techniques/processes as presented in the examples herein. Computer readable medium 220 may be representative of any data storage mechanism.

Processing unit(s) 202/210 may be implemented in hardware or a combination of hardware and software. Processing unit(s) 202/210 may be representative of one or more circuits configurable to perform at least a portion of a data computing procedure or process. By way of example but not limitation, processing unit(s) 202/210 may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory and/or a secondary memory. Primary memory may include, for example, a random access memory, read only memory, etc. While illustrated in this example as being separate from processing unit(s) 202/210, it should be understood that at least a portion of a primary memory may be provided within or otherwise co-located/coupled with processing unit(s) 202/210, SPS receiver 104, back-end processor 210, etc. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220.

As further illustrated in FIG. 2, device 102 may include one or more connections 206 (e.g., buses, lines, conductors, fibers, etc.) to operatively couple the various circuits together and carry one or more electronic signals there between, and a user interface 214 (e.g., display, touch screen, keypad, buttons, knobs, microphone, speaker, etc.) to receive user input and/or provide information to the user. Device 102 may include a communication network interface 230 (e.g., wireless transceiver, modem, antenna, etc.) to allow for communication with one or more other devices over a communication link (e.g., link 150 in FIG. 1).

Figure 3A:
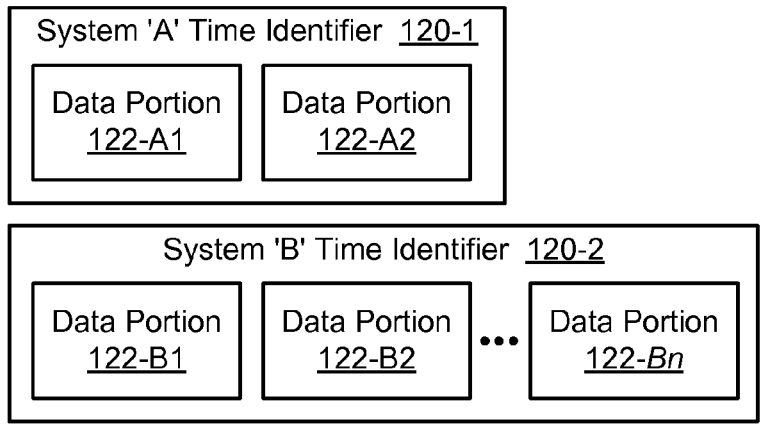
FIGS. 3A-C are functional diagrams visually illustrating some example information and functions associated with a process that may be implemented in whole or part in a device, for example as in FIG. 2, and which uses portions of system time identifiers from different systems to determine at least one system time, in accordance with an implementation.
Figure 3B:
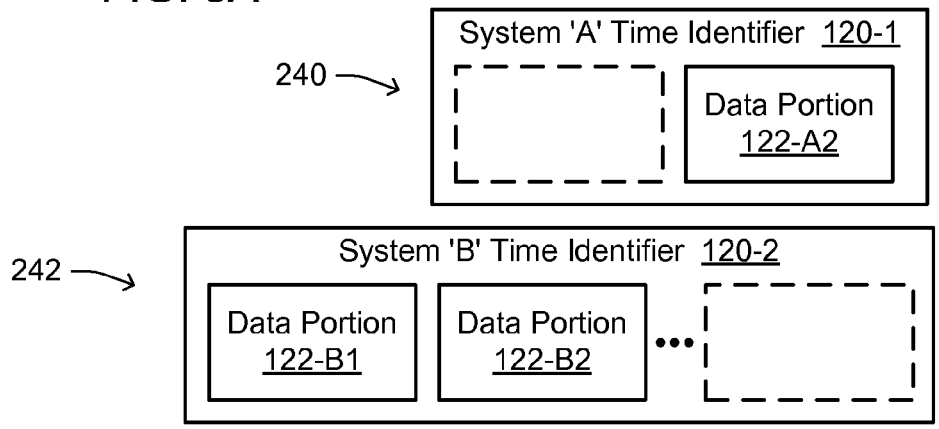
Figure 3C:
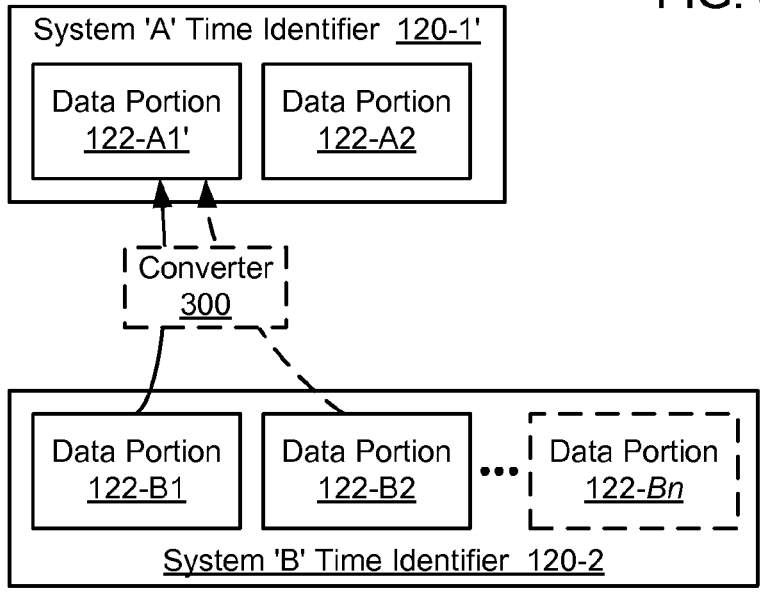

Reference is made next to FIGS. 3A-C, which are functional diagrams visually illustrating some example information and functions associated with a process that may be implemented in whole or part in a device, for example as in FIG. 2, and which uses portions of system time identifiers from different systems to determine at least one system time, in accordance with an implementation.

As illustrated in FIG. 3A, in certain situations it may be possible to obtain a system time identifier 120 as transmitted from a system (e.g., a navigation system). Here, for example, assuming that a system 'A' is a GNSS, ideally device 102 (FIG. 2) would obtain a system 'A' time identifier 120-1 having all of its applicable data portions (e.g., here data portions 122-A1 and 122-A2). Accordingly, in such a situation device 102 may directly identify the system time for the system 'A' GNSS with system 'A' time identifier 120-1. By way of example but not limitation, system 'A' time identifier 120-1 may be associated with GPS such that data portion 122-A1 represents a GPS week number and data portion 122-A2 represents a GPS time of week.

Similarly, it may be possible for device 102 to obtain one or more other system time identifiers 120 as transmitted from other systems (e.g., other navigation systems, etc.). Here, for example, assuming that a system 'B' is also a GNSS, ideally device 102 would obtain a system 'B' time identifier 120-2 having all of its applicable data portions (e.g., here data portions 122-B1, 122-B2, . . . , 122-Bn). Accordingly, in such a situation device 102 would be also be able to directly identify the system time for the system 'B' GNSS with system 'B' time identifier 120-2. By way of example but not limitation, system 'B' time identifier 120-2 may be associated with GLONASS such that data portion 122-B1 represents a GLONASS Four-year Interval Number, data portion 122-B2 represents a GLONASS Calendar Day Number in Four-year Interval, and data portion 122-Bn represents a GLONASS Time of Day. Those skilled in the art will recognize that in this example the GLONASS Calendar Day is the current calendar day as opposed to an additional calendar day parameter in a Glonass navigation message that represents a Calendar day of the almanac information.

As illustrated in FIG. 3B, in certain other situations it may not be possible for device 102 to obtain or quickly obtain a system time identifier 120 as transmitted from a navigation system. Here, for example, as illustrated with regard to system 'A' time identifier 120-1, only data portion 122-A2 is currently available (compare to FIG. 3A). In certain examples, data portion 122-A2 may represent partial first system time information 240. Accordingly, in such a situation a conventional device may not yet be able to identify the system time for the system 'A' GNSS. Furthermore, for example, as illustrated with regard to system 'B' time identifier 120-2, it may be that data portion 122-Bn has yet to be obtained (compare to FIG. 3A). In certain examples, data portion 122-B1 and/or 122-B2 may represent partial second system time information 242. Accordingly, in such a situation a conventional device may not yet be able to identify the system time for system 'B' either.

As illustrated in FIG. 3C, however, in accordance with certain aspects of the present description, device 102 (FIG. 2) may be able to identify at least a first system time by using available partial system time information from two or more systems. By way of example only, given the available data portions as illustrated in FIG. 3B, a system 'A' time identifier 120-1' and/or the like may be established by using one or more other data portions and/or the like to establish one or more data portions that are unavailable in system 'A' time identifier 120-1 (FIG. 3B).

For example as illustrated in FIG. 3C, a data portion 122-A-1' may be established based, at least in part, on data portion 122-B1 and/or data portion 122-B2 which are available in this example from system 'B' time identifier 120-2. As further illustrated, in certain implementations some of the information that may be used to perform such operative substitution may need to be converted and/or otherwise changed in some manner to establish one or more data portions that were unavailable. Thus, an optional converter 300 function is shown in FIG. 3C which may support various conversions or other like processes. Converter 300 may be implemented, for example, in one or more processing units 202 and/or processor 210 and represented by instructions 270 (FIG. 2) to perform certain mathematical operations, etc.

Figure 4:
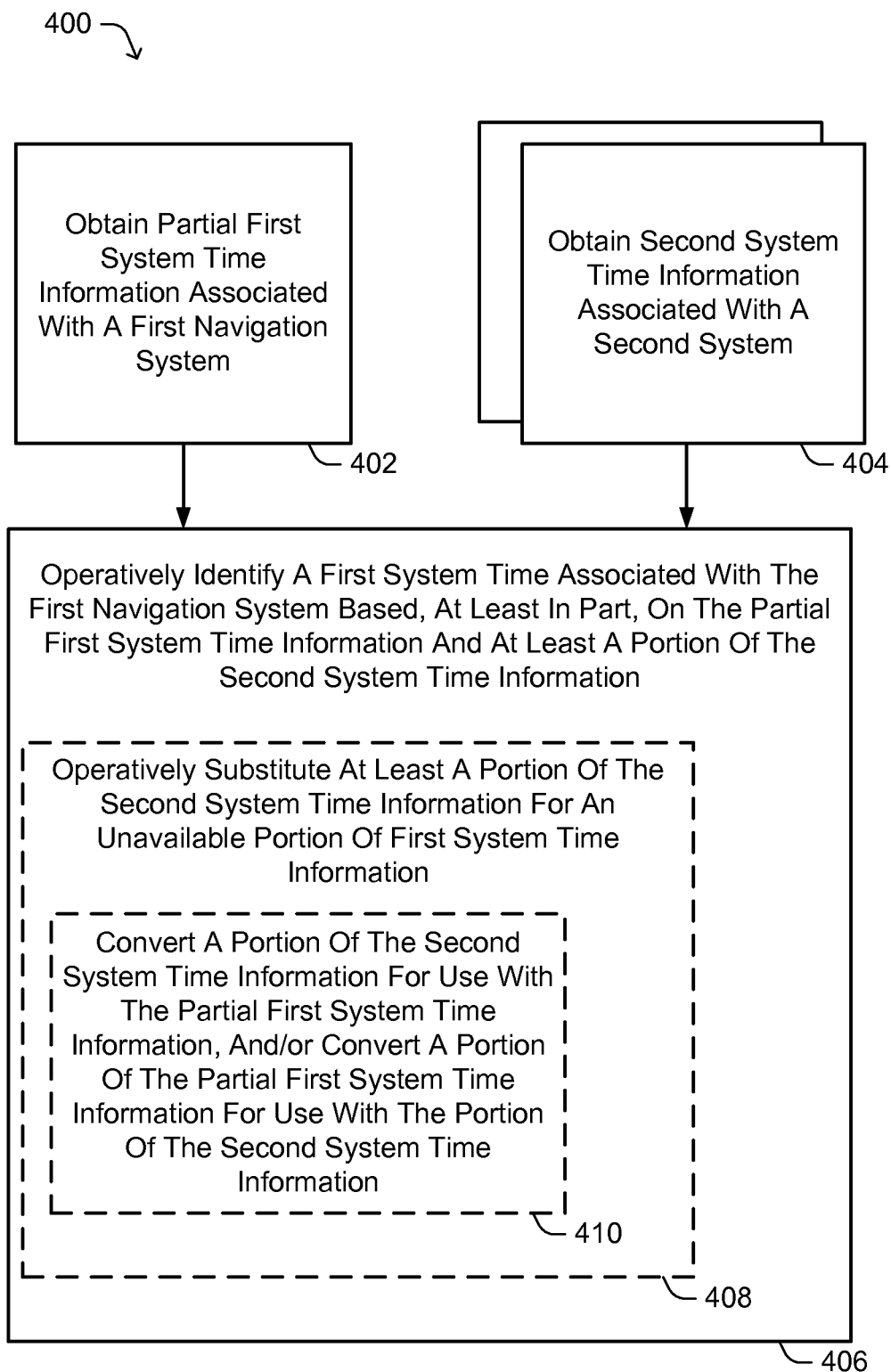
FIG. 4 is a flow diagram illustrating an example process that may be implemented in whole or part in a device, for example as in FIG. 2, to perform a quick time-to-fix position/ velocity estimation process by using portions of system time identifiers from different systems to determine at least one system time, in accordance with an implementation.

Reference is made next to FIG. 4, which is a flow diagram illustrating an example process 400 that may be implemented in whole or part in a device, for example as in FIG. 2, and which may use portions of system time identifiers from different systems to determine at least one system time, in accordance with an implementation.

At block 402, partial first system time information associated with a first navigation system may be obtained. For example, partial first system time information may be received via one or more SPS signals.

At block 404, at least a portion of second system time information associated with a second system may be obtained. For example, partial second system time information may be received via one or more SPS signals and/or other wireless signals.

At block 406, a first system time associated with the first navigation system may be operatively identified based, at least in part, on the partial first system time information and at least a portion of the second system time information. For example, at (optional) block 408, at least a portion of the second system time information may be operatively substituted for an unavailable portion of first system time information. Here, for example, at (optional) block 410, a portion of said second system time information may be converted for use with the partial first system time information, and/or a portion of the partial first system time information may be converted for use with the portion of the second system time information.

The techniques illustrated in process 400 may, for example, be expanded to include (e.g., at block 404) obtaining other system time information comprising at least a portion of system time identifier(s) associated with a other (e.g. third, fourth, . . . ) systems, and (e.g., at block 406) operatively identifying a first system time based also, at least in part, on at least a portion of such other available system time information.

Those skilled in the art will recognize that such operative substitutions and/or applicable conversions may take on various forms depending on the specific systems and information involved.

With this in mind, a non-limiting example situation will now be presented to further illustrate some of the potential uses and/or benefits of the techniques described herein.

Typically, to compute a navigation solution, an SPS receiver (here, for example, a combined GPS and GLONASS receiver) may determine an offset between a GNSS time scale and the receiver's internal time reference. Such offset may relate to differences in the phasing of the two time-scales. A process of learning a current GNSS time in order to resolve the offset between GNSS time and a receiver's internally maintained time is sometimes referred to as 'setting time'. In an externally aided, GNSS receiver, for example, a current GNSS time may be received at run time from one or more aiding device(s). Alternatively, a SPS receiver may maintain a current GNSS time across a period of non-operation by running a real-time clock (RTC). However, excluding such example external sources of time information, a SPS receiver may decode a current GNSS time from a navigation message of at least one SV (here, e.g., either GPS or GLONASS).

Often, in a degraded signal environment, time set may be delayed because only a portion of a navigation message has been obtained (e.g., successfully decoded). As previously mentioned the example techniques described herein may be implemented in ways that may reduce a time-to-fix and/or other improve yield in an SPS receiver enabled device, e.g., by potentially setting time faster and/or enabling the setting of time in degraded signal conditions.

Here, continuing with the earlier example of a device having obtained some system time information for GPS and GLONASS, in order to unambiguously set time from a GPS navigation message, a SPS receiver may demodulate data portions providing GPS Week Number and GPS Time of Week. Here, for example, GPS Week Number may be transmitted once every thirty seconds and GPS Time of Week may be transmitted every six seconds. In order to unambiguously set time from a GLONASS navigation message, a SPS receiver may demodulate data portions providing GLONASS Four-year Interval Number, GLONASS Calendar Day Number in Four-year Interval, and GLONASS Time of Day. Here, for example, such GLONASS data portions may each be transmitted once every 30 seconds.

With the techniques provided herein, for example, in this example situation unambiguous time may also be obtained using the following non-limiting exemplary combinations:

1) GLONASS Four-year Interval Number, GLONASS Calendar Day Number in Four-year Interval, and GPS Time of Week.
2) GPS Week Number, GLONASS Calendar Day Number in Four-year Interval, and GLONASS Time of Day.

Accordingly, by implementing some or all of the techniques provided herein, a device may significantly reduce the time it takes to set time and/or be capable of setting time in certain situations that some conventional devices may not. For example, in certain implementations, a device may successfully decode and store GPS week number but subsequently lose (e.g., temporarily) the ability to obtain additional GPS navigation data. Such device may be able to successfully decode GLONASS Four-year Interval Number and GLONASS Calendar Day Number in Four-year Interval but subsequently lose (e.g., temporarily) the ability to obtain additional GLONASS navigation data. In such a scenario, however, a device may be enabled to, nonetheless, unambiguously set time.

In still other example scenarios, a device may unambiguously set time quicker in response to having obtained enough of various system time information rather than waiting for certain unavailable portions to be transmitted and decoded.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
with a satellite positioning system (SPS) receiver enabled device:
obtaining one or more electronic signals representing partial first system time information, said partial first system time information comprising one or more portions but not all of a first system time identifier identifying a system time, wherein the system time is an instance of an incrementing time value associated with a first navigation system;
obtaining one or more electronic signals representing second system time information, said second system time information comprising at least a portion of a second system time identifier associated with a second system, wherein said first navigation system and said second system comprise different Global Navigation Satellite Systems; and
generating one or more electronic signals operatively identifying a first system time associated with said first navigation system based, at least in part, on said partial first system time information and at least said portion of said second system time information, wherein the at least said portion of said second system time information provides information on one or more of the missing portions of time of said partial first system time information.

2. The method as recited in claim 1, wherein said first system time identifier comprises a plurality of data portions that together identify said first system time.

3. The method as recited in claim 2, wherein at least two of said plurality of data portions are periodically transmitted by said first navigation system at different intervals.

4. The method as recited in claim 2, wherein said partial first system time information comprises a subset of said plurality of data portions.

5. The method as recited in claim 2, wherein each of the plurality of data portions represent a separate and distinct portion of the linear sequence of time, that together identify said first system time, and wherein at least one of said plurality of data portions has not been obtained, and wherein generating said one or more electronic signals operatively identifying said first system time further comprises operatively substituting at least said portion of said second system time information for said at least one of said plurality of data portions that has not been obtained, wherein the at least said portion of said second system time information does not overlap in time with any of the data portions in the plurality of data portions that has been obtained.

6. The method as recited in claim 5, wherein operatively substituting at least said portion of said second system time information for said at least one of said plurality of data portions that has not been obtained further comprises at least one of:
converting at least said portion of said second system time information for use with said partial first system time information, and/or
converting at least a portion of said partial first system time information for use with at least said portion of said second system time information.

7. The method as recited in claim 1, wherein said one or more electronic signals operatively identifying said first system time specifies a first system time offset operatively associated with a locally maintained time.

8. The method as recited in claim 1, further comprising:
with said SPS receiver enabled device:
obtaining one or more electronic signals representing third system time information, said third system time information comprising at least a portion of a third system time identifier associated with a third system, and wherein generating said one or more electronic signals operatively identifying said first system time further comprises generating said one or more electronic signals operatively identifying said first system time based also, at least in part, on at least said portion of said third system time information.

9. The method of claim 1, further comprising:
determining to be unable to identify the first system time based on only the partial first system time information.

10. The method of claim 1, wherein said partial first system time information and at least said portion of said second system time information used to generate said one or more electronic signals comprises data indicative of four-year interval number, GLONASS calendar day number in four-year interval, and GPS time of week.

11. The method of claim 1, wherein said partial first system time information and at least said portion of said second system time information used to generate said one or more electronic signals comprises data indicative of GPS week number, GLONASS calendar day number in four-year interval, and GLONASS time of day.

12. An apparatus comprising:
means for obtaining partial first system time information, said partial first system time information comprising one or more portions but not all of a first system time identifier identifying a system time, wherein the system time is an instance of an incrementing time value associated with a first navigation system;
means for obtaining second system time information, said second system time information comprising at least a portion of a second system time identifier associated with a second system, wherein said first navigation system and said second system comprise different Global Navigation Satellite Systems; and
means for identifying a first system time associated with said first navigation system based, at least in part, on said partial first system time information and at least said portion of said second system time information, wherein the at least said portion of said second system time information provides information on one or more of the missing portions of time of said partial first system time information.

13. The apparatus as recited in claim 12, wherein said first system time identifier comprises a plurality of data portions that together identify said first system time.

14. The apparatus as recited in claim 13, wherein at least two of said plurality of data portions are periodically transmitted by said first navigation system at different intervals.

15. The apparatus as recited in claim 13, wherein said partial first system time information comprises a subset of said plurality of data portions.

16. The apparatus as recited in claim 13, wherein each of the plurality of data portions represents a separate and distinct portion of the linear sequence of time, that together identify said first system time, and wherein at least one of said plurality of data portions has not been obtained, and further comprising:
means for operatively substituting at least said portion of said second system time information for said at least one of said plurality of data portions that has not been obtained, wherein the at least said portion of said second system time information does not overlap in time with any of the data portions in the plurality of data portions that has been obtained.

17. The apparatus as recited in claim 16, further comprising at least one of:
means for converting at least said portion of said second system time information for use with said partial first system time information, and/or
means for converting at least a portion of said partial first system time information for use with at least said portion of said second system time information.

18. The apparatus as recited in claim 12, further comprising:
means for obtaining a locally maintained time; and
wherein said first system time specifies a first system time offset operatively associated with said locally maintained time.

19. The apparatus as recited in claim 12, further comprising:
means for obtaining third system time information, said third system time information comprising at least a portion of a third system time identifier associated with a third system, and wherein said means for identifying said first system time further identifies said first system time based also, at least in part, on at least said portion of said third system time information.

20. An apparatus comprising:
memory having stored therein partial first system time information, said partial first system time information comprising one or more portions but not all of a first system time identifier identifying a system time, wherein the system time is an instance of an incrementing time value associated with a first navigation system, and second system time information, said second system time information comprising at least a portion of a second system time identifier associated with a second system, wherein said first navigation system and said second system comprise different Global Navigation Satellite Systems; and
one or more processing units coupled to said memory and operable to identify a first system time associated with said first navigation system based, at least in part, on said partial first system time information and at least said portion of said second system time information, wherein the at least said portion of said second system time information provides information on one or more of the missing portions of time of said partial first system time information.

21. The apparatus as recited in claim 20, wherein said first system time identifier comprises a plurality of data portions that together identify said first system time.

22. The apparatus as recited in claim 21, further comprising:
a satellite positioning system (SPS) receiver coupled to at least one of said memory and/or said one or more processing units and operable to receive at least two of said plurality of data portions as periodically transmitted by said first navigation system at different intervals.

23. The apparatus as recited in claim 21, wherein said partial first system time information comprises a subset of said plurality of data portions.

24. The apparatus as recited in claim 21, wherein each of the plurality of data portions represents a separate and distinct portion of the linear sequence of time, that together identify said first system time, and wherein at least one of said plurality of data portions is unavailable in said memory, and wherein said one or more processing units is operable to substitute at least said portion of said second system time information for said at least one of said plurality of data portions that is unavailable in said memory, wherein the at least said portion of said second system time information does not overlap in time with any of the data portions in the plurality of data portions that has been obtained.

25. The apparatus as recited in claim 24, wherein said one or more processing units is further operable to convert at least said portion of said second system time information for use with said partial first system time information, and/or convert at least a portion of said partial first system time information for use with at least said portion of said second system time information.

26. The apparatus as recited in claim 20, wherein said first system time specifies a first system time offset operatively associated with a locally maintained time.

27. The apparatus as recited in claim 20, wherein said memory has stored therein third system time information, said third system time information comprising at least a portion of a third system time identifier associated with a third system, and wherein said one or more processing units further identifies said first system time based also, at least in part, on at least said portion of said third system time information.

28. The apparatus of claim 20, wherein the one or more processing units is further operable to determine to be unable to identify the first system time based on only the partial first system time information.

29. The apparatus of claim 20, wherein said partial first system time information and at least said portion of said second system time information used to generate said one or more electronic signals comprises data indicative of four-year interval number, GLONASS calendar day number in four-year interval, and GPS time of week.

30. The method of claim 20, wherein said partial first system time information and at least said portion of said second system time information used to generate said one or more electronic signals comprises data indicative of GPS week number, GLONASS calendar day number in four-year interval, and GLONASS time of day.

31. An article comprising:
a non-transitory computer readable medium having computer implementable instructions stored thereon that in response to being executed by one or more processing units in an electronic device enable the electronic device to:
access partial first system time information, said partial first system time information comprising one or more portions but not all of a first system time identifier identifying a system time, wherein the system time is an instance of an incrementing time value associated with a first navigation system;
access second system time information, said second system time information comprising at least a portion of a second system time identifier associated with a second system, wherein said first navigation system and said second system comprise different Global Navigation Satellite Systems; and
identify a first system time associated with said first navigation system based, at least in part, on said partial first system time information and at least said portion of said second system time information, wherein the at least said portion of said second system time information provides information on one or more of the missing portions of time of said partial first system time information.

32. The article as recited in claim 31, wherein said first system time identifier comprises a plurality of data portions that together identify said first system time.

33. The article as recited in claim 32, wherein at least two of said plurality of data portions are periodically transmitted by said first navigation system at different intervals.

34. The article as recited in claim 32, wherein said partial first system time information comprises a subset of said plurality of data portions.

35. The article as recited in claim 32, wherein each of the plurality of data portions represents a separate and distinct portion of the linear sequence of time, and wherein at least one of said plurality of data portions is unavailable, and wherein the computer implementable instructions in response to being executed by the one or more processing units in the electronic device further enable the electronic device to:
operatively substituting at least said portion of said second system time information for said at least one of said plurality of data portions that is unavailable, wherein the at least said portion of said second system time information does not overlap in time with any of the data portions in the plurality of data portions that is available.

36. The article as recited in claim 35, wherein the computer implementable instructions in response to being executed by the one or more processing units in the electronic device further enable the electronic device to:
convert at least said portion of said second system time information for use with said partial first system time information, and/or
convert at least a portion of said partial first system time information for use with at least said portion of said second system time information.

37. The article as recited in claim 31, wherein said first system time specifies a first system time offset operatively associated with said locally maintained time.

38. The article as recited in claim 31, wherein the computer implementable instructions in response to being executed by the one or more processing units in the electronic device further enable the electronic device to:
access third system time information, said third system time information comprising at least a portion of a third system time identifier associated with a third system; and
identify said first system time based also, at least in part, on at least said portion of said third system time information.

* * * * *